United States Patent
Ingoglia et al.

(10) Patent No.: US 11,291,229 B2
(45) Date of Patent: Apr. 5, 2022

(54) MEAT ANALOGS COMPRISING THIN FLAKES FOR FOOD COMPOSITIONS

(71) Applicant: NESTEC SA, Vevey (CH)

(72) Inventors: Caroline Ingoglia, Aubigny (FR); Laurent Patrick Rouanet, Villers-Bretonneux (FR)

(73) Assignee: SOCIÉTÉ DES PRODUITS NESTLÉ S.A., Vevey (CH)

( * ) Notice: Subject to any disclaimer, the term of this patent is extended or adjusted under 35 U.S.C. 154(b) by 71 days.

(21) Appl. No.: 16/294,148

(22) Filed: Mar. 6, 2019

(65) Prior Publication Data

US 2019/0274340 A1    Sep. 12, 2019

Related U.S. Application Data

(60) Provisional application No. 62/639,276, filed on Mar. 6, 2018.

(51) Int. Cl.
*A23L 13/10* (2016.01)
*A23L 13/20* (2016.01)
(Continued)

(52) U.S. Cl.
CPC .................. *A23L 13/10* (2016.08); *A23J 3/22* (2013.01); *A23J 3/26* (2013.01); *A23K 10/20* (2016.05); *A23K 10/24* (2016.05); *A23K 10/26* (2016.05); *A23K 20/147* (2016.05); *A23K 20/163* (2016.05); *A23K 20/174* (2016.05); *A23K 40/25* (2016.05); *A23K 50/45* (2016.05); *A23K 50/48* (2016.05); *A23L 13/06* (2016.08); *A23L 13/20* (2016.08); *A23L 13/422* (2016.08); *A23L 13/424* (2016.08); *A23L 13/426* (2016.08); *A23L 13/428* (2016.08);
(Continued)

(58) Field of Classification Search
CPC ..... A23L 13/10; A23K 20/147; A23K 20/163; A23K 20/174; A23K 40/25; A23K 50/45; A23K 50/48; A23K 10/20
USPC ......... 426/72, 573, 656, 513, 514, 516, 519, 426/523, 802, 74, 578, 657, 805, 558, 426/647, 614, 635
See application file for complete search history.

(56) References Cited

U.S. PATENT DOCUMENTS

| 4,603,055 A | 7/1986 | Karwowski et al. |
| 4,895,731 A | 1/1990 | Baker et al. |

(Continued)

FOREIGN PATENT DOCUMENTS

| CA | 2222714 A1 * | 1/1997 |
| CN | 102283389 | 12/2011 |

(Continued)

*Primary Examiner* — Helen F Heggestad

(57) ABSTRACT

A method of making a food product can include forming an emulsion containing a meat and a firming agent that is one or more of plasma, whole egg powder, guar gum, pea fiber, pea protein, carboxymethyl cellulose (CMC) or a modified cereal starch; directing the emulsion through a die to form a meat analog; cooking the meat analog with steam; and cutting the meat analog into thin flakes. The method can include cooling the meat analog before the cutting. The method can include mixing the thin flakes of the meat analog with jelly or gravy to form a blended food composition in which a ratio of the flakes to the jelly or gravy is about 30:70 to about 70:30.

21 Claims, 2 Drawing Sheets

(51) Int. Cl.

| | |
|---|---|
| *A23L 13/40* | (2016.01) |
| *A23L 21/10* | (2016.01) |
| *A23L 29/219* | (2016.01) |
| *A23L 29/238* | (2016.01) |
| *A23L 29/262* | (2016.01) |
| *A23L 29/281* | (2016.01) |
| *A23L 33/15* | (2016.01) |
| *A23L 33/16* | (2016.01) |
| *A23K 10/26* | (2016.01) |
| *A23K 20/147* | (2016.01) |
| *A23K 20/163* | (2016.01) |
| *A23K 20/174* | (2016.01) |
| *A23K 40/25* | (2016.01) |
| *A23K 50/48* | (2016.01) |
| *A23L 13/00* | (2016.01) |
| *A23J 3/26* | (2006.01) |
| *A23K 10/20* | (2016.01) |
| *A23J 3/22* | (2006.01) |
| *A23K 10/24* | (2016.01) |
| *A23L 13/60* | (2016.01) |
| *A23K 50/45* | (2016.01) |

(52) U.S. Cl.
CPC ............. *A23L 13/432* (2016.08); *A23L 13/67* (2016.08); *A23L 21/10* (2016.08); *A23L 29/219* (2016.08); *A23L 29/238* (2016.08); *A23L 29/262* (2016.08); *A23L 29/281* (2016.08); *A23L 33/15* (2016.08); *A23L 33/16* (2016.08); *A23V 2002/00* (2013.01)

(56) References Cited

U.S. PATENT DOCUMENTS

| | | | |
|---|---|---|---|
| 5,567,466 | A | 10/1996 | Dupont-Delhovren |
| 5,792,504 | A * | 9/1998 | Poppel et al. |
| 6,280,779 | B1 * | 8/2001 | Nadeau et al. |
| 2006/0105084 | A1 | 5/2006 | Fee |
| 2006/0210675 | A1 | 9/2006 | Gifford |
| 2008/0166443 | A1 | 7/2008 | Busse et al. |
| 2009/0110778 | A1 * | 4/2009 | Muscroft |
| 2012/0171336 | A1 | 7/2012 | Dixon |
| 2014/0154390 | A1 | 6/2014 | Rayner et al. |
| 2015/0208689 | A1 * | 1/2015 | Rayner et al. |
| 2015/0320085 | A1 | 11/2015 | Ray |
| 2018/0295861 | A1 | 10/2018 | Mao et al. |
| 2018/0295862 | A1 | 10/2018 | Mao et al. |
| 2019/0343146 | A1 * | 11/2019 | Cheison et al. |

FOREIGN PATENT DOCUMENTS

| | | | |
|---|---|---|---|
| CN | 102771718 | | 11/2012 |
| DE | 130305 | * | 3/1978 |
| JP | 2000500003 A1 | * | 1/2000 |
| JP | 2001086959 | | 4/2001 |
| RU | 2558537 | * | 8/2015 |
| WO | 2004/045302 | * | 3/2004 |
| WO | 2008085293 | | 7/2008 |
| WO | 2009/003721 | * | 1/2009 |
| WO | WO 2018125621 | * | 5/2018 |
| WO | 2018125615 | | 7/2018 |
| WO | 2018125621 | | 7/2018 |

* cited by examiner

MEAT ANALOGS COMPRISING THIN FLAKES FOR FOOD COMPOSITIONS

CROSS REFERENCE TO RELATED APPLICATIONS

This application claims priority to U.S. Provisional Application Ser. No. 62/639,276 filed Mar. 6, 2018, the disclosure of which is incorporated in its entirety herein by this reference.

BACKGROUND

To reduce the cost of certain food products to consumers, in recent years there has been a demand for meat emulsion products that resemble chunks or pieces of natural meat in appearance, texture and physical structure. Such products are used as a partial or complete replacement for more expensive natural meat chunks in food products such as stews, potpies, casseroles, canned foods, and pet food products. Chunky meat products are highly desirable in human foods and pet foods, both for aesthetic quality and consumer appeal. These chunky products provide a more economical product, which attempts to simulate natural meat chunks in shape, appearance, and texture. Retention of shape, appearance, and texture when these products are subjected to commercial canning and retorting procedures is highly desirable.

"Chunks-in-gravy" is a particularly popular form of pet food due to its ability to evoke the aesthetics of a human food casserole. To make this pet food, meat analogs can be mixed into a flowable gravy that may be transparent or opaque. The aesthetic desirability of such products depends greatly on the appearance of the meat analog, for example its size, shape and texture.

Existing meat analog chunks made by a steam oven and used with gravy are typically cereal-based. In this regard, cereal-based chunks absorb gravy well and thus provide a smooth cosmetic that does not look too watery after retort. However, cereal-based meat analogs can reduce palatability and can present challenges to the cutting and dicing process required to form pieces that visually resemble real meat. Additionally, cereal-based meat analogs often have an unattractive bread-like texture with pores and tend to clump together in their package.

There is therefore a need for foods that simulate real meat pieces, visually and texturally, without the drawbacks seen with existing products.

SUMMARY

The compositions and methods of the present disclosure enable making thin and firm all-meat chunks from cooking in a steam oven that in turn enable aggressive slicing after exiting the steam oven. Thin and smooth flakes can be produced that can be utilized in jelly or gravy-containing products. In one embodiment, the meat analog of the present disclosure can exit the steam oven as a rope, which can then be sliced into thin flakes. Cooling the rope before slicing can make the rope firmer and reduce production of fines.

Accordingly, in a general embodiment, the present disclosure provides a method of making a food product. The method comprises: forming an emulsion comprising a meat and a firming agent selected from the group consisting of plasma, whole egg powder, guar gum, pea fiber, pea protein, carboxymethyl cellulose (CMC), a modified cereal starch, and mixtures thereof; directing the emulsion through a die to form a meat analog; heating the meat analog with steam to form a cooked meat analog, and cutting the meat analog into thin flakes, wherein the thin flakes have a thickness from about 0.5 mm to about 2.5 mm.

In an embodiment, the firming agent is selected from the group consisting of (i) plasma alone without another firming agent, (ii) a combination of plasma and pea protein, (iii) a combination of plasma and pea fiber and (iv) a combination of plasma and CMC.

In an embodiment, the firming agent is about 6 wt. % to about 9 wt. % of the meat analog.

In an embodiment, the firming agent comprises at least 50 wt. % of plasma.

In an embodiment, the heating of the meat analog comprises subjecting the meat analog to a steam oven at a throughput from about 250 to about 300 kg/h.

In an embodiment, the cooked meat analog has a temperature from about 50° C. to about 70° C.

In an embodiment, the method comprises cooling the meat analog before the cutting. The cooled meat analog can have a temperature from about 20° C. to about 40° C.

In an embodiment, the method comprises mixing the thin flakes with a jelly or gravy to form a blended food composition in which a ratio of the flakes to the jelly or gravy is about 30:70 to about 70:30. The blended food composition can comprise about 75 wt. % to about 90 wt. % moisture, about 5 wt. % to about 15 wt. % protein, about 1 wt. % to about 10 wt. % fat, and about 1 wt. % to about 5 wt. % ashes. The method can comprise filling the jelly or gravy and the thin flakes into containers that then are vacuum-sealed and retorted.

In an embodiment, the emulsion is an all-meat emulsion. In another embodiment, the emulsion comprises a cereal, a starch, or a combination thereof.

In an embodiment, the food product is a pet food product.

In an embodiment, the present disclosure provides a food product made by a process comprising: forming an emulsion comprising a meat and a firming agent selected from the group consisting of plasma, whole egg powder, guar gum, pea fiber, pea protein, carboxymethyl cellulose (CMC), a modified cereal starch, and mixtures thereof, directing the emulsion through a die to form a meat analog, heating the meat analog with steam to form a cooked meat analog, and cutting the cooked meat analog into thin flakes, wherein the thin flakes have a thickness from about 0.5 mm to about 2.5 mm.

In another embodiment, the present disclosure provides a food product comprising a meat analog. The meat analog comprises thin flakes with a thickness from about 0.5 mm to about 2.5 mm, a meat in an amount from about 30 wt. % to about 90 wt. %, and a firming agent in an amount from about 6 wt. % to about 9 wt. %, wherein the firming agent is selected from the group consisting of plasma, whole egg powder, guar gum, pea fiber, pea protein, carboxymethyl cellulose (CMC), a modified cereal starch, and mixtures thereof In an embodiment, the firming agent comprises at least 50 wt. % of plasma.

In an embodiment, the thin flakes of the meat analog are irregularly shaped.

In an embodiment, the thin flakes consist of natural ingredients.

In an embodiment, the food product further comprises a jelly or gravy.

In an embodiment, each of the thin flakes is an all-meat composition.

In an embodiment, each of the thin flakes consists essentially of the meat, the firming agent, water, and one or more of an animal fat, a vitamin, a mineral, a preservative, a colorant or a palatant.

In an embodiment, the food product is a pet food product.

An advantage of one or more embodiments provided by the present disclosure is greater formula flexibility for manufacture of meat analogs.

Another advantage of one or more embodiments provided by the present disclosure is to improve existing meat analog production processes.

Yet another advantage of one or more embodiments provided by the present disclosure is to create new concepts in meat analog recipes.

Still another advantage of one or more embodiments provided by the present disclosure is to manufacture a meat analog product with less or no cereal proteins.

Another advantage of one or more embodiments provided by the present disclosure is all-natural, grain-free meat analog chunks.

Yet another advantage of one or more embodiments provided by the present disclosure is to produce thin flakes of a meat analog that have a more natural visual appearance, as opposed to cubic and artificial-looking chunks.

Still another advantage of one or more embodiments provided by the present disclosure is to minimize or prevent meat analog flakes from clinging together in packaging.

Another advantage of one or more embodiments provided by the present disclosure is food product textural modification by physical treatment, for example a wet food for a companion animal.

Additional features and advantages are described herein and will be apparent from the following Detailed Description and the Figures.

DETAILED DESCRIPTION

Definitions

Figure 1:
FIG. 1 is a photograph of a non-limiting example of meat analog chunks subjected to irregular cutting as in Example 1 in the present disclosure. The flakes are about 0.5 to 1 mm thick and are thin and flexible with a ribbon-like and non-rigid texture.

Some definitions are provided hereafter. Nevertheless, definitions may be located in the "Embodiments" section below, and the above header "Definitions" does not mean that such disclosures in the "Embodiments" section are not definitions.

As used in this disclosure and the appended claims, the singular forms "a," "an" and "the" include plural referents unless the context clearly dictates otherwise. Thus, for example, reference to "a piece" of the composition or "the piece" of the composition includes two or more pieces. The term "and/or" used in the context of "X and/or Y" should be interpreted as "X," or "Y," or "X and Y." Similarly, the term "at least one of" used in the context of "at least one of X or Y" should be interpreted as "X," or "Y," or "X and Y." Where used herein, the term "example," particularly when followed by a listing of terms, is merely exemplary and illustrative, and should not be deemed to be exclusive or comprehensive.

As used herein, "about," "substantially" and "approximately" are understood to refer to numbers in a range of numerals, for example the range of −5% to +5% of the referenced number, preferably within −1% to +1% of the referenced number, more preferably within −0.5% to +0.5% of the referenced number, most preferably within −0.1% to +0.1% of the referenced number.

"Regular" shaped flakes have substantially the same shape and dimensions as each other. "Irregular" shaped flakes do not have substantially the same shape and dimensions as each other. In a preferred embodiment, irregularly shaped flakes each have at least one dimension that is not about equal to the corresponding dimension of the other flakes, preferably at least two dimensions that are not about equal to the corresponding dimensions of the other flakes, more preferably at least three dimensions that are not about equal to the corresponding dimensions of the other flakes. In some embodiments, irregularly shaped flakes have approximately the same thickness but have at least one dimension (e.g., at least two dimensions) that are not about equal to the corresponding dimensions of the other flakes (e.g., length, width, diagonal).

As used herein, "thin" in reference to the thickness of the flakes is meant as a thickness of about 0.5 mm to about 2.5 mm. In one embodiment, the flakes have a thickness of less than about 1.7 mm. In one embodiment, the thickness is about 0.5 mm to about 1.7 mm. In other embodiments, the thickness is about 0.5 mm to about 1.5 mm, about 0.5 mm to about 1.3 mm, about 1 mm to about 1.7 mm, or about 1 mm to about 1.5 mm.

A range that is "between" two values includes those two values. Furthermore, all numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

All percentages expressed herein are by weight of the total weight of the meat analog and/or the corresponding emulsion unless expressed otherwise. When reference is made to the pH, values correspond to pH measured at 25° C. with standard equipment.

The terms "food," "food product," and "food composition" mean a product or composition that is intended for ingestion by an animal, including a human, and provides at least one nutrient to the animal. The term "pet food" means any food composition intended to be consumed by a pet. The term "pet" means any animal which could benefit from or enjoy the compositions provided by the present disclosure. For example, the pet can be an avian, bovine, canine, equine, feline, hircine, lupine, murine, ovine, or porcine animal, but the pet can be any suitable animal. The term "companion animal" means a dog or a cat.

A "blended" composition merely has at least two components having at least one different characteristic relative to each other, preferably at least moisture content and water activity in the context of the present disclosure. In this regard, description of a composition as "blended" does not imply that the blended composition has been subjected to processing sometimes referenced as "blending," namely mixing components so that they are indistinguishable from each other, and preferably such processing is avoided when mixing the meat analog with another comestible composition (e.g., a gravy or broth) to form the blended composition disclosed herein.

A "dry" food composition has less than 10 wt. % moisture and/or a water activity less than 0.64, or in some instances both. A "semi-moist" food composition has about 11 wt. % to about 20 wt. % moisture and/or a water activity of about 0.64 to about 0.75, in some instances both. A "wet" food composition has more than about 20 wt. % moisture and/or a water activity higher than about 0.75, in some instances both.

A "meat analog" is a meat emulsion product that resembles pieces of natural meat in appearance, texture, and physical structure. An "all meat" composition means that all of the macronutrients (i.e., fat, protein, carbohydrate) in the composition are from meat, and in some embodiments, a meat analog is an all-meat composition. For example, an all-meat composition does not contain any soy, cereal (e.g., wheat, corn, oats, rice, amaranth, barley, buckwheat, fonio, millet, rye, sorghum, triticale, or quinoa) or ingredient derived from soy or cereal (e.g., gluten, cereal starch). An "all meat" composition does not necessarily contain 100% meat and may not contain 100% meat, due to the presence of micronutrients (e.g., vitamins and minerals). In some embodiments, a meat analog is not an all-meat composition (e.g., contains pea protein, pea fiber, or modified cereal starch such as corn starch).

"Natural" is used herein consistently with the definition by The Association of American Feed Control Officials (AAFCO). Specifically, a natural food product or ingredient is a feed or feed ingredient derived solely from plant, animal or mined sources, either in its unprocessed state or having been subject to physical processing, heat processing, rendering, purification, extraction, hydrolysis, enzymolysis or fermentation, but not having been produced by or subject to a chemically synthetic process and not containing any additives or processing aids that are chemically synthetic except in amounts as might occur in good manufacturing practices.

The term "flakes," "chunks," and "slices" are used synonymously herein, and all terms mean a plurality of separate food bodies preferably made by slicing the meat emulsions disclosed herein into separate pieces. In some embodiments, the flakes, chunks, or slices are pieces of wet or semi-moist pet food.

The compositions disclosed herein may lack any element that is not specifically disclosed herein. Thus, a disclosure of an embodiment using the term "comprising" includes a disclosure of embodiments "consisting essentially of" and "consisting of" the components identified. Similarly, the methods disclosed herein may lack any step that is not specifically disclosed herein. Thus, a disclosure of an embodiment using the term "comprising" includes a disclosure of embodiments "consisting essentially of" and "consisting of" the steps identified. Any embodiment disclosed herein can be combined with any other embodiment disclosed herein unless explicitly and directly stated otherwise.

"Consisting essentially of" means that the embodiment comprises more than 50% of the identified components, preferably at least 75% of the identified components, more preferably at least 85% of the identified components, most preferably at least 95% of the identified components, for example at least 99% of the identified components.

Embodiments

The present inventors recognized that extrusion of thin pieces of meat analog was challenging due to inflation of the meat slab both as it travelled through the steam oven and again after retort. The surface became very bumpy due to the release of vapor at the steam oven exit, and furthermore the extrusion of these "sheets" limited the process to a very low throughput. Moreover, the emulsion created potential blockages of the small opening of the die due to bone and fiber buildup.

Therefore, an aspect of the present disclosure is a method of producing a meat analog, the method comprising: creating an emulsion, forming the emulsion through a die to form a meat analog and heating said meat analog with steam (e.g., by subjecting the emulsion to a steam oven), and then cutting the cooked meat analog into thin flakes. The thin flakes have a thickness from about 0.5 mm to about 2.5 mm. The thin flakes are visually and texturally similar to real meat.

The steam oven can be any device that applies steam to the meat analog to heat the meat analog, for example by converting water from a reservoir or water line into steam, and the present disclosure is not limited to a specific embodiment of the steam oven. In an embodiment, the steam oven is operated with a throughput between about 250 and about 300 kg/h, preferably between about 258 and about 277 kg/h. In an embodiment, the die opening has dimensions of about 10×5 mm or 10×10 mm.

In an embodiment, the meat analog is heated to a temperature of about 50° C. to about 70° C., for example about 60° C. As a non-limiting example, the steam oven can subject the meat analog to a temperature of about 60° C. to about 80° C. (e.g., about 70° C.) for about 150 seconds to about 170 seconds (e.g., about 160 seconds), and the cooked meat analog can be sliced with a device having two knives. As another non-limiting example, the steam oven can subject the meat analog to a temperature of about 60° C. to about 80° C. (e.g., about 70° C.) for about 110 seconds to about 130 seconds (e.g., about 120 seconds), and the cooked meat analog can be sliced with a device having four knives.

The method can optionally comprise cooling the cooked meat analog before the cutting, for example to a temperature of about 20° C. to about 40° C., for example about 30° C. Optionally, the cooked meat analog is not cooled before the cutting.

The flakes can be mixed with a jelly (i.e., a sauce in a gel form) and/or a gravy (i.e., a sauce in a sol form) to form a blended food composition. A jelly or a gravy can be a composition comprising water and a thickener that is at least one of a starch or a gum. The ratio of the flakes to the jelly or gravy can be about 30:70 to about 70:30, for example about 40:60, about 45:55 or about 50:50.

Examples of suitable gums are gellan gum, xanthan gum, guar gum, locust bean gum, pectin, carrageenan (e.g., kappa, iota and/or lambda), cellulose gum, gum arabic and the like, and mixtures thereof. Suitable starches include native starches, starch esters, starch ethers, and modified starches, such as starch modified with erythorbic acid, and mixtures thereof. Starch sources can include wheat, barley, rice, tapioca, potato and corn, for example. The jelly or gravy can also comprise dextrose and/or glycine and can also include a colorant as desired. Ingredients that add flavor and/or aroma to the jelly or gravy can also be included as desired. A non-limiting example of a suitable gravy comprises water, glycine, xanthan, dextrose, xylose and choline chloride.

The resultant blended food composition can have about 75 wt. % to about 90 wt. % moisture, for example about 82% moisture; about 5 wt. % to about 15 wt. % protein, for example about 9 wt. % protein; about 1 wt. % to about 10 wt. % fat, for example about 5 wt. % fat; and about 1 wt. % to about 5 wt. % ashes, for example about 2 wt. % ashes.

The meat analog flakes and jelly or gravy can be filled into containers in the desired proportions to form a blended food (e.g. pet food), and the containers can be vacuum-sealed and then retorted under time-temperature conditions sufficient to effect commercial sterilization. Retorting procedures may be used, for example, a retorting temperature of about 118° C. to 121° C. for approximately 40 to 90 minutes to produce a sterile product suitable for commerce.

For example, the flakes can be mixed with another comestible composition such as gravy (e.g., a starch and/or a gum in water), broth in which another comestible composition has been simmered, vegetables (e.g., potatoes, squash, zucchini, spinach, radishes, asparagus, tomatoes, cabbage, peas, carrots, spinach, corn, green beans, lima beans, broccoli, Brussels sprouts, cauliflower, celery, cucumbers, turnips, yams and mixtures thereof), condiments (e.g., parsley, oregano, and/or spinach flakes), or kibbles (e.g., pellets of dry pet food).

Generally, the emulsion comprises meat. In some of the embodiments, the emulsion is an all-meat emulsion as defined herein.

In the present disclosure, the term "meat" means meat and meat by-products including carcass, bones, skin, offal, and muscle, especially those types of meats suitable for pets, in the fresh state or preserved by an appropriate treatment (e.g., frozen). Meat includes meals such as meat meal, bone meal, fish meal, and poultry meal. In the present disclosure, fish and fish by-products are respectively considered meat and meat by-products. Fish and fish by-products are understood to mean fish or fish parts in the fresh state or preserved by an appropriate treatment, as well as the by-products of their processing. Salmon or sardines can be used as fish, and fish meal can be used as a meat by-product.

Non-limiting examples of suitable meat include poultry (e.g., chicken, turkey, duck and goose); pork; bovines including cow, calf and veal; ovines including lamb and sheep; fish (e.g., tuna, salmon, trout, and cod); and by-products from such meats. Non-limiting examples of suitable meat-by-product include any meat by-product approved for use in animal foods, such as mechanically deboned beef, chicken or fish; beef and pork liver; lungs; and kidneys.

In an embodiment, the meat is a combination of different types of meats.

In an embodiment, the meat can include viscera obtained from any suitable source. Typically, viscera include the soft internal organs of the body, for example lungs, spleen, kidneys, brain, livers, partially-defatted low-temperature fatty tissue, and stomachs and intestines, freed of their contents; especially those organs contained within the abdominal and thoracic cavities. Additionally or alternatively to soft internal organs, viscera can include blood and/or bone. One example of the definition of viscera is given by the Association of American Feed Control Officials, Inc. (AAFCO). AAFCO generally defines viscera as all the organs in the three great cavities of the body (abdominal, thoracic, and pelvic) but defines viscera for fish as all organs in the great cavity of the body, including the gills, heart, liver, spleen, stomach, and intestines. Similarly AAFCO defines viscera for mammals as all organs in the great cavity of the body, including the esophagus, heart, liver, spleen, stomach, and intestines, but excludes the contents of the intestinal tract and defines viscera for poultry as all organs in the great cavity of the body, including the esophagus, heart, liver, spleen, stomach, crop, gizzard, undeveloped eggs, and intestines. In various embodiments, the viscera may be pretreated as known to skilled artisans, e.g., by stirring, homogenizing, emulsifying, and the like. Some embodiments of the meat emulsion comprise chicken viscera.

The emulsion further comprises a firming agent, for example, one or more of plasma, whole egg powder, guar gum, pea fiber, pea protein, carboxymethyl cellulose (CMC), or a modified cereal starch such as modified corn starch. A modified starch is a starch that has been subjected to one or more of physical, enzymatic or chemical treatment.

In some embodiments, the firming agent can be about 6.0 wt. % to about 9.0 wt. % of the meat analog. In some embodiments, the firming agent is plasma alone or in combination with another firming agent. For example, the firming agent can be selected from the group consisting of (i) plasma that is about 6.0 wt. % to about 9.0 wt. % of the meat analog, for example about 8.0 wt. % to 8.75 wt. % of the meat analog, (ii) plasma that is about 6.0 wt. % to about 9.0 wt. % of the meat analog, for example about 6.0 wt. % to about 8.0 wt. % of the meat analog, in combination with about 0.5 wt. % to about 5.0 wt. % pea protein, for example, about 1.0 wt. % to about 2.0 wt. % pea protein, (iii) plasma that is about 6.0 wt. % to about 9.0 wt. % of the meat analog, for example about 6.0 wt. % to about 8.0 wt. % of the meat analog, in combination with about 0.5 wt. % to about 5.0 wt. % pea fiber, for example about 1.0 wt. % to about 2.0 wt. % pea fiber, and (iv) plasma that is about 6.0 wt. % to about 9.0 wt. % of the meat analog, for example about 6.0 wt. % to about 8.0 wt. % of the meat analog, in combination with about 0.01 wt. % to about 0.10 wt. % CMC, for example about 0.03 wt. % to about 0.05 wt. % CMC.

The meat analog (i.e., the heated meat emulsion) may have about 5.0 wt. % to about 15 wt. % of water, for example about 8.0 wt. % to about 9.0 wt. % water. At least a portion of the water can be provided by the steam that heats the meat analog.

The meat analog can include other components in addition to the meat, the firming agent and the water, for example one or more of an animal fat, a vitamin, a mineral, a preservative, a colorant or a palatant.

Non-limiting examples of suitable animal fats include chicken fat, pork fat, tallow or grease. Non-limiting examples of suitable vitamins include vitamin A, any of the B vitamins (e.g., choline chloride), vitamin C, vitamin D, vitamin E, and vitamin K, including various salts, esters, or other derivatives of the foregoing. Non-limiting examples of suitable minerals include calcium (e.g., calcium carbonate), phosphorous, potassium, sodium, iron, chloride, boron, copper, zinc, magnesium, manganese, iodine, selenium, and the like.

Non-limiting examples of suitable preservatives include sodium tripolyphosphate, potassium sorbate, sorbic acid, sodium methyl para-hydroxybenzoate, calcium propionate, propionic acid, and combinations thereof. Non-limiting examples of suitable colorants include FD&C colors, such as blue no. 1, blue no. 2, green no. 3, red no. 3, red no. 40, yellow no. 5, yellow no. 6, and the like; natural colors, such as roasted malt flour, caramel coloring, annatto, chlorophyllin, cochineal, betanin, turmeric, saffron, paprika, lycopene, elderberry juice, pandan, butterfly pea and the like; titanium dioxide; and any suitable food colorant known to the skilled artisan. Non-limiting examples of suitable palatants include yeast, tallow, rendered animal meals (e.g., poultry, beef, lamb, and pork), flavor extracts or blends (e.g., grilled beef), animal digests, and the like.

In some embodiments, a plasticizing or water-controlling agent may be added to the emulsion to promote retention of at least some of the available water and thereby soften the texture of the eventual final product. Any suitable plasticizing or water-controlling agent may be used. Non-limiting examples include hydrogenated corn syrup, glycerin, propylene glycol, butylene glycol, polyhydric alcohols such as glycerol and sorbitol, sugars such as invert sugar and sucrose, and salts such as sodium chloride and sodium pyrophosphates.

EXAMPLES

The following non-limiting examples are illustrative of embodiments provided by the present disclosure.

Example 1

Pilot plant trials tested a wide variety of ingredients as meat firming agents, specifically plasma, whole egg powder, pea fiber, pea protein, cellulose, carboxymethyl cellulose (CMC), modified corn starch, and guar gum. Plasma was the best firming agent to obtain firm chunks that allowed thin cutting. Whole egg powder had a good effect on firmness. Pea protein, and pea fiber can be used to replace a portion of plasma powder. A portion of the plasma powder was replaced with CMC. For example, 0.04 wt. % CMC and 1.96 wt. % water were used in a formulation to replace 2% of the plasma powder. The CMC sample had lower quality chunks. Modified cornstarch allowed a little smoother cutting but precluded the flakes from being "all meat."

An example of a formulation that enabled making thin flakes is provided in Table 1 below. The flakes were mixed with gravy to make a flakes-and-gravy composition having a gravy:flake ratio of 40:60. The resultant nutrition profile was 82 wt. % moisture, 9 wt. % protein, 5 wt. % fat, and 2 wt. % ash.

TABLE 1

| Ingredients | Weight % Based on Meat Analog |
| --- | --- |
| Organs/boneless meats and meat byproducts (including animal meals) | 50-65% |
| Bone-in meats and meat byproducts (including animal meals) | 0-30% |
| Firming agent | 6-9% |
| Vitamin/Mineral | 0.5-3% |
| Water | 0-10% |

Cutting tests were conducted. Slices were cut with a thickness of about 2 mm, and flakes with good texture were obtained even without cooling the meat analog before cutting. Emulsions were extruded through a 10 mm×10 mm die or a 10 mm×5 mm die with nearly the same final product. The parameters were adapted during each trial depending on the emulsion viscosity, the amount of bubbles created during cooking, and cutting quality. The throughput was between 258 kg/h and 277 kg/h for a recipe using 8 wt. % plasma, which may be improved with new dies, for example a 15 mm×15 mm die.

Then two different slicers were tested in the cutting process. First, a slicer with twenty-four knives which is typically used for human food like sausages or vegetables was used for a pilot trial. Different parameters settings, i.e., adjusting belt and knives speeds, and two different band temperatures were used to check if cooling before cutting had a significant impact.

Some analog bands were cooled to 30° C. while the hot analog bands were at 60° C. With the tested recipes, no difference in terms of cutting quality was observed. As shown in FIG. 1, very nice flakes were obtained with belt speed at 15 Hz and knives speed at 45 Hz, using five to twenty analog bands at the same time, close to the cutting.

Figure 2:
FIG. 2 is a photograph of flakes from Example 1 that are thin and flexible with a ribbon-like and non-rigid texture.

For irregular flakes, the belt speed was increased to 20 Hz and the knives speed was decreased to 30-40 Hz with fifteen to twenty analog bands at the same time. Then the flakes were produced with thickness under 1 mm, with belt speed at 12 Hz and knives speed at 66 Hz, (FIG. 2).

The cutting step was tested with or without prior cooling. No cosmetic difference was observed, and the firmness of the chunks without cooling was enough to undergo slicing.

A second slicer was used with frozen analog bands. The internal belt was removed to obtain more irregular chunks.

Conveying tests were conducted. In this regard, the different speeds of the steam oven and the slicer belts require a specific conveying process. The slicer belt speed typically is faster than the steam oven speed and not capable to cut forty analog bands at the same time, so the transfer of ten to twenty analog bands of 50-100 cm from the oven belt to the slicer must be managed. Standard transfer on 50 cm analog bands was tested, and no degradation and no fines were observed, with very few analog bands cut by the rotary valve.

Further trials were conducted to test the palatability of the samples. For example, a recipe with meat, 8 wt. % plasma, and some condiments (i.e., spinach and carrots) was utilized. The palatability result was 8% exclusion/128 g average consumption, which indicated that the palatability was very good.

Regarding chunk size, palatability of standard size (10× 10×7 mm) was compared to flake size (10×10×2 mm) with the same recipe (8 wt. % plasma) and the same gravy:chunks or gravy:flake ratio. Regarding formulation, all meat with 8 wt. % plasma was compared to all meat with 3 wt. % wheat flour, and all meat with 8 wt. % plasma was compared to all meat with 2 wt. % modified cornstarch. No impact to palatability was observed in these trials. However, all meat with 8 wt. % plasma and no viscera was compared to all meat with 8 wt. % plasma with chicken viscera, and a positive impact on palatability was observed from inclusion of chicken viscera.

In summary, there was no impact of chunk size to palatability, modified starch can be added to achieve a smoother cutting without palatability degradation, and chicken viscera was preferable for inclusion in the recipe.

In conclusion, good results for palatability and the ability to produce thin flakes were obtained for a recipe with all-meat and 8 wt. % plasma powder, and all-meat with the combination of 6 wt. % plasma powder and 2 wt. % modified cornstarch. Optionally, viscera can be included.

Example 2

Different recipes for meat-based steam oven chunks were tested in order to achieve smooth slices that would withstand fast slicing and subsequent mixing. Table 2 below shows a formulation for an all-meat emulsion containing plasma ("standard"). This standard formulation uses an amount of firming agent, such as plasma, that is from about 2 wt. % to 5.5 wt. % (e.g., about 5 wt. %) of the meat analog. The standard formulation was used as a comparative control to formulations using higher amounts of firming agent, specifically 6 wt. % to 9 wt. % of the meat analog.

TABLE 2

| Ingredients | Weight % Based on Meat Analog |
|---|---|
| Organs/boneless meats and meat byproducts (including animal meals) | 55-75% |
| Bone-in meats and meat byproducts (including animal meals) | 10-30% |
| Firming agent | 2-5.5% |
| water | 0-10% |
| Vitamin/Mineral | 0.5-3% |

A 10×5 mm die can be used, but a 10×10 mm die was used so that the slices were larger. These pilot trials involved dicing the meat analog using dicer with four knives. The cook time was decreased from about 160 seconds to about 120 seconds. The basin temperature was about 70° C.

After the emulsion was extruded through the die and cooked in the steam oven, bands (not chunks) were taken off the belt to the lab for texture analysis. Texture measurements were taken to show maximum force before breakage. The bands were 10×10 mm±2 depending on the expansion of the recipe in the steam oven. The die utilized was 10×10 mm in most of the trials. The following settings for texture analysis were used:

Probe: 6 mm diameter
Test speed: 2 mm/s
Distance: 70% of band height
10 repetitions
Breaking force measured in grams Measurements were taken at room temperature (23° C.) unless otherwise specified.

The initial trial tested the (i) "standard" all meat formulation and formulations based on the standard formulation, specifically a boneless recipe in which mechanically recovered turkey (MRM turkey) was used instead of carcass, (ii) a "high plasma" recipe in which 8.75 wt. % of plasma was used with meat comprising kidney, (iii) a "guar+plasma" recipe in which 5 wt. % of plasma and 1.1 wt. % of guar were used with meat comprising kidney, and (iv) an "egg+plasma" recipe in which 5 wt. % of plasma and 6.6 wt. % of whole egg powder were used with meat comprising kidney.

The texture analysis results showed that the "high plasma" sample (ii) gave the firmest chunk, and the "egg+plasma" sample (iv) was cosmetically similar. The "guar+plasma" sample (iii) was less smooth, but nevertheless did not have many fines.

A second trial further investigated the high plasma concept with a small portion of the plasma replaced with alternative sources. Three recipes were evaluated: (i) a "high plasma (−) water" sample used 8.75 wt. % plasma with no water added (replaced by 3 wt. % carcass), (ii) a "pea protein" sample used 6.5 wt. % plasma and 2 wt. % pea protein, and (iii) a "modified starch" sample used 6.5 wt. % plasma and 2 wt. % modified cornstarch.

The texture analysis results showed that all three recipes had similar maximum force, and samples showed they were close cosmetically as well. The main difference was that the modified starch recipe (iii) gave a slightly more yellowish gravy, but the gravy was still quite clear. Samples opened over a month later looked even smoother.

A third trial further investigated the effect of changing the meats to include greaves to give a drier emulsion to prevent the cooked bands from sticking together. Three different recipes were evaluated: (i) a "high plasma+greaves" sample used 8 wt. % plasma with 3.5 wt. % pork greaves (without viscera), (ii) a "7% plasma+1% peapro" sample used 7 wt. % plasma and 1 wt. % pea protein with 3.5 wt. % pork greaves (without viscera), and (iii) a "6% plasma+2% peapro" sample used 6 wt. % plasma and 2 wt. % pea protein with 3.5 wt. % pork greaves (without viscera).

The texture analysis results showed that the 5% plasma recipe was less firm, and this was reflected in the final product. The standard recipe with 5% plasma was mushy without defined chunks, and the pea protein/greaves gave more cloudy gravy (no colorant is added in the greaves).

A fourth trial tested the efficacy of internal pea fiber as a replacement for a portion of the plasma in the high plasma (8%) recipe. Four different recipes were evaluated: (i) a "high plasma+greaves" sample used 8 wt. % plasma with 3.5 wt. % pork greaves (without viscera), (ii) a "7% plasma+1% intpeafiber" sample used 7 wt. % plasma and 1 wt. % pea fiber with 3.5 wt. % pork greaves (without viscera), (iii) a "6% plasma+2% intpeafiber" sample used 6 wt. % plasma and 2 wt. % pea fiber with 3.5 wt. % pork greaves (without viscera), and (iv) a "6% plasma+1% intpeafiber" sample used 6 wt. % plasma and 1 wt. % pea fiber with 3.5 wt. % pork greaves (without viscera).

The texture analysis results showed that samples with increased plasma relative to the standard were all comparable with good flakes; they absorbed more gravy and surrounding gravy looked a bit darker. Again, the standard recipe with 5% plasma produced lower quality flakes with a lot of fines.

The greaves used in the fourth trial was suspected of giving cloudy gravy and "gritty" texture, so it was removed in the fifth trial. Instead, turkey skin was included, and the amounts of the viscera and the kidney were replaced with carcass to target the same moisture level without greaves. The fat level was increased with pork fat.

Specifically, the fifth trial evaluated (i) a "8% plasma" sample containing 8 wt. % plasma with turkey skin and without greaves, (ii) a "6% plasma+2% cellulose" sample containing 6 wt. % plasma and 2 wt. % cellulose with turkey skin and without greaves, (iii) a "8% plasma+pork fat" sample containing 8 wt. % of plasma with pork fat and no greaves or turkey skin, and a (iv) "6% plasma+CMC 0.04%" sample containing 6 wt. % plasma, 0.04 wt. % CMC, and water.

The texture analysis results showed that the CMC sample was statistically less firm, but visually good flakes were still obtained. All samples produced well-defined chunks. The gravy was still a bit cloudier than in previous samples.

A sixth trial was performed with additional knives fitted to the slicer such that instead of two knives it had four knives. The steam oven parameters were correspondingly adjusted to meet the standard throughput and obtain thin flakes. The tested recipes were the "standard" formulation and the "high plasma" and "modified starch" recipes which previously gave the best cosmetic results of all the options tested.

The texture analysis results showed that the high plasma recipe is significantly firmer than the other two formulas. The modified starch recipe gave a much better flake than the 5% plasma recipe. More knives provided slightly better flakes with the standard 5% plasma recipe than previous trials. Although, the "standard" recipe still gave rougher slices and more fines than the other two samples. For the bands themselves, the breaking force target should be about 700 g at 20° C.

In conclusion, the trials showed that plasma at 6 wt. % or with other powders as replacements, and cutting with a slicer having two knives produced slices that were thin (for example, 0.5 mm to 2.5 mm). Increasing the number of knives in the slicer provided some improvement with less plasma and without addition of other firming agents. The thin flakes were also produced with 8 to 8.75 wt. % plasma in the emulsion. Pea fiber, modified cornstarch, cellulose, and pea protein can be used to help provide firmness and a smoother looking chunk if plasma is reduced below 6.5 wt. % at a 1:1 ratio. These other firming agents can provide better "stand-up" of the emulsion on the belt and can also help provide smoothness by absorbing more water from the gravy, unlike plasma. CMC was effective, and 0.04% CMC could effectively replace 2 wt. % of plasma. Egg powder was a good alternative as well for partial plasma replacement and could potentially be used to replace plasma completely.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of making a food product, the method comprising:
    forming an emulsion comprising a meat and a combination of plasma and whole egg powder;
    directing the emulsion through a die to form a meat analog;
    heating the meat analog with steam to form a cooked meat analog; and
    cutting the cooked meat analog into thin flakes, wherein the thin flakes have a thickness from about 0.5 mm to about 2.5 mm,
    wherein the meat analog is grain-free, does not contain any cereal, does not contain any pea protein and does not contain any pea fiber.

2. The method of claim 1, wherein the plasma is about 6.0 wt. % to about 9.0 wt. % of the meat analog.

3. The method of claim 1, wherein the combination of the plasma and the whole egg powder comprises at least 50% by weight of the plasma.

4. The method of claim 1, wherein the heating of the meat analog comprises subjecting the meat analog to a steam oven at a throughput from about 250 to about 300 kg/h.

5. The method of claim 1, wherein the cooked meat analog has a temperature from about 50° C. to about 70° C.

6. The method of claim 1, comprising cooling the cooked meat analog before the cutting to form a cooled meat analog such that the cooled meat analog has a temperature from about 20° C. to about 40° C.

7. The method of claim 1, comprising mixing the thin flakes with a jelly or gravy to form a blended food composition in which a ratio of the flakes to the jelly or gravy is about 30:70 to about 70:30.

8. The method of claim 7, wherein the blended food composition comprises about 75 wt. % to about 90 wt. % moisture, about 5 wt. % to about 15 wt. % protein, about 1 wt. % to about 10 wt. % fat, and about 1 wt. % to about 5 wt. % ashes.

9. The method of claim 7, further comprising filling a container with the blended food composition, wherein the container is vacuum-sealed and retorted.

10. The method of claim 1, wherein the emulsion is an all-meat emulsion.

11. The method of claim 1, wherein the food product is a pet food product.

12. The method of claim 1, wherein each of the thin flakes of the meat analog comprises about 5.0 wt. % to about 15 wt. % of water.

13. A food product comprising a meat analog, wherein the meat analog comprises thin flakes with a thickness from about 0.5 mm to about 2.5 mm, and wherein the meat analog comprises a meat in an amount from about 30 wt. % to about 90 wt. %, and a combination of plasma and whole egg powder, wherein the meat analog is grain-free, does not contain any cereal, does not contain any pea protein and does not contain any pea fiber.

14. The food product of claim 13, wherein the combination of the plasma and the whole egg powder comprises at least 50% by weight of the plasma.

15. The food product of claim 13, wherein the thin flakes are irregular shapes.

16. The food product of claim 13, wherein the thin flakes consist of natural ingredients.

17. The food product of claim 13, further comprising a jelly or gravy.

18. The food product of claim 13, wherein each of the thin flakes is an all-meat composition.

19. The food product of claim 13, wherein each of the thin flakes of the meat analog comprises about 5.0 wt. % to about 15 wt. % of water.

20. The food product of claim 13, wherein each of the thin flakes consists essentially of the meat, the combination of the plasma and the whole egg powder, water, and one or more of an animal fat, a vitamin, a mineral, a preservative, a colorant or a palatant.

21. The food product of claim 13, wherein the food product is a pet food product.

* * * * *